United States Patent
Ohlbach et al.

(10) Patent No.: US 6,878,798 B2
(45) Date of Patent: Apr. 12, 2005

(54) METHOD FOR PRODUCING A POLYMER, USING CAPROLACTAM

(75) Inventors: Frank Ohlbach, Düsseldorf (DE); Helmut Winterling, Ludwigshafen (DE); Andreas Ansmann, Wiesloch (DE); Rolf-Hartmuth Fischer, Heidelberg (DE); Johann-Peter Melder, Böhl-Iggelheim (DE); Stefan Maixner, Schwetzingen (DE); Peter Bassler, Viernheim (DE); Hermann Luyken, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 211 days.

(21) Appl. No.: 10/257,876

(22) PCT Filed: Apr. 30, 2001

(86) PCT No.: PCT/EP01/04836

§ 371 (c)(1), (2), (4) Date: Oct. 17, 2002

(87) PCT Pub. No.: WO01/83589

PCT Pub. Date: Nov. 8, 2001

(65) Prior Publication Data

US 2003/0135019 A1 Jul. 17, 2003

(30) Foreign Application Priority Data

May 3, 2000 (DE) ......................... 100 21 191

(51) Int. Cl.$^7$ .................. C08G 69/08; C08G 73/10
(52) U.S. Cl. .................. 528/310; 528/312; 528/322; 528/323; 540/539; 428/357; 428/395; 428/396
(58) Field of Search .................. 528/310, 312, 528/322, 323; 540/539, 540; 428/357, 395, 396

(56) References Cited

U.S. PATENT DOCUMENTS

| | | | | |
|---|---|---|---|---|
| 4,301,073 A | * | 11/1981 | Fuchs et al. | 260/239.3 |
| 4,629,776 A | * | 12/1986 | Curatolo et al. | 528/313 |
| 5,032,684 A | | 7/1991 | Neubauer et al. | 540/540 |
| 5,298,594 A | * | 3/1994 | Yuo et al. | 528/313 |
| 5,496,941 A | | 3/1996 | Ritz et al. | 540/540 |
| 5,739,324 A | * | 4/1998 | Fuchs et al. | 528/310 |
| 6,201,096 B1 | * | 3/2001 | Marchildon et al. | 528/310 |
| 6,358,373 B1 | * | 3/2002 | Leemann et al. | 203/29 |
| 6,437,089 B1 | * | 8/2002 | Cohen et al. | 528/310 |
| 6,525,167 B1 | * | 2/2003 | Mohrschladt | 528/310 |
| 6,531,570 B1 | * | 3/2003 | Mohrschladt | 528/310 |
| 6,699,960 B1 | * | 3/2004 | Ohlbach et al. | 528/310 |
| 6,703,476 B2 | * | 3/2004 | Mohrschladt | 528/310 |

FOREIGN PATENT DOCUMENTS

| | | |
|---|---|---|
| DE | 75 083 | 8/1970 |
| EP | 144 452 | 6/1985 |
| GB | 969993 | 9/1964 |
| WO | 99/10408 | 3/1999 |

OTHER PUBLICATIONS

Ullmann's Enc.Ind.Chem,5th Ed., vol. A5,VCH, 1986, 46–48.
Kirk–Othmer, Enc. of Chem. Tech.,4th Ed., vol. 4, 1992, p. 836.
OZ 0050/48751—BASF.
OZ 0050/48749—BASF.
OZ 0050/48748.

* cited by examiner

Primary Examiner—P. Hampton Hightower
(74) Attorney, Agent, or Firm—Novak Druce & Quigg, LLP

(57) ABSTRACT

A process for preparing a polymer, which comprises
  a) reacting a mixture (I) containing 6-aminocapronitrile and water in the presence of a catalyst to obtain a mixture (II) containing caprolactam, ammonia, water, high boilers and low boilers, then
  b) removing ammonia from mixture (II) to obtain a mixture (III) containing caprolactam, water, high boilers and low boilers, then
  c) removing all or some of the water from mixture (III) to obtain a mixture (IV) containing caprolactam, high boilers and low boilers and then
  d) feeding mixture (IV) to a polymerization reaction, and also the polymer obtainable by this process, the use of the polymer for producing fibers, sheetlike structures and moldings, and also fibers, sheetlike structures and moldings obtainable using such a polymer.

10 Claims, No Drawings

METHOD FOR PRODUCING A POLYMER, USING CAPROLACTAM

DESCRIPTION

The present invention relates to a process for preparing a polymer using caprolactam, which comprises a) reacting a mixture (I) containing 6-aminocapronitrile (å-aminocapronitrile, "ACN") and water in the presence of a solid catalyst for the reaction to obtain a mixture (II) containing caprolactam, ammonia, water, high boilers and low boilers, then b) removing ammonia from mixture (II) to obtain a mixture (III) containing caprolactam, water, high boilers and low boilers, then c) removing all or some of the water from mixture (III) to obtain a mixture (IV) containing caprolactam, high boilers and low boilers and then d) feeding mixture (IV) to a polymerization reaction.

The present invention further relates to a polymer obtainable by this process, to the use of the polymer for producing fibers, sheetlike structures and moldings, and to fibers, sheetlike structures and moldings obtainable using such a polymer.

Processes for preparing caprolactam and processes for preparing polymers using caprolactam are generally known.

Caprolactam can be prepared by Beckmann rearrangement of cyclohexanone oxime using sulfuric acid or oleum. After neutralization of the thus obtained mixture with ammonia, the caprolactam can be obtained from the by-produced ammonium sulfate by extraction with an organic solvent.

Depending on the processes for preparing the reactants used to prepare the cyclohexanone oxime, such as cyclohexanone and hydroxylammonium sulfate, and the oximation and rearrangement conditions, the crude caprolactam obtained by Beckmann rearrangement contains impurities which differ in kind and amount.

Caprolactam is also obtainable by reaction of ACN with water in the gas or liquid phase in the presence or absence of a catalyst with release of ammonia.

The as-obtained mixture, as well as caprolactam, water, ammonia, any further liquid diluent, contains impurities having a boiling point above that of caprolactam ("high boilers") and impurities having a boiling point below that of caprolactam ("low boilers").

U.S. Pat. No. 5,496,941 discloses in the example that removing water, solvent, ammonia, low boilers and high boilers from a mixture obtained in the reaction of ACN with water and solvent leaves a crude caprolactam having a purity of 99.5%.

It is generally known, for example from Ullmann's Encyclopedia of Industrial Chemistry, 5th Ed., Vol. A5, VCH Verlagsgesellschaft mbH, Weinheim (Germany), 1986, pages 46–48, or Kirk-Othmer, Encyclopedia of Chemical Technology, 4th Ed., Vol. 4, John Wiley & Sons, New York, 1992, page 836, that caprolactam used for preparing polymers has to have a purity of from 99.9 to 99.94%, the main impurity usually being water in an amount of from 0.04 to 0.1%. Other impurities may be present only in the region of not more than a few ppm.

Various processes have been described for purifying the crude caprolactam obtained in the Beckmann rearrangement.

According to DE-A-1253716, the crude caprolactam can be purified by hydrogenation in suspension in the presence of a catalyst and in the presence of an acid.

According to DE-A-1253716, the crude caprolactam can be purified by hydrogenation in suspension in the presence of a catalyst and in the presence of a base.

DD-A-75083 describes a process for purifying crude caprolactam wherein the crude caprolactam is first distilled and then, dissolved in an organic solvent, is hydrogenated in the presence of a catalyst and then treated with an ion exchanger.

According to EP-A-411455, the characteristic important quality features for caprolactam can be complied with by continuously hydrogenating the crude caprolactam in a liquid phase process.

Other purification processes have been described for a crude caprolactam obtained from ACN, since the impurities of such a crude caprolactam differ substantially from those of a crude caprolactam obtained by Beckmann rearrangement, as described in U.S. Pat. No. 5,496,941.

According to U.S. Pat. No. 5,496,941, ACN is reacted in a first step to form caprolactam, low boilers, water, ammonia and any further solvents are simultaneously removed, high boilers are removed to obtain a crude caprolactam in a purity of 99.5%, this crude caprolactam is hydrogenated in the presence of a catalyst, the product obtained is treated with an acidic ion exchanger or sulfuric acid and the product obtained is distilled in the presence of a base.

The purification processes mentioned have the disadvantage that they are technically inconvenient and energy intensive, especially on account of the numerous separating steps.

It is an object of the present invention to provide a process which permits the preparation of polymers using caprolactam in a technically simple and energy-conserving manner for similar product parameters of the polymers compared with such polymers as are prepared using caprolactam which has been purified by a technically inconvenient and energy-intensive process.

We have found that this object is achieved by the process defined at the beginning, a polymer obtainable by this process, the use of the polymer for producing fibers, sheetlike structures and moldings and also fibers, sheetlike structures and moldings obtainable using such a polymer.

In step a), a mixture (I) containing 6-aminocapronitrile, water and optionally liquid diluent is reacted in the presence of a solid catalyst for the reaction to obtain a mixture (II) containing caprolactam, ammonia, water, any liquid diluent, high boilers and low boilers.

The ACN required for step a) is obtainable from adiponitrile, as is generally known from Ullmann's Encyclopedia of Industrial Chemistry, 5th Ed., Vol. A5, VCH Verlagsgesellschaft mbH, Weinheim (Germany), 1986, page 46, FIG. 8.

Particularly useful for this are the partial catalytic hydrogenation of adiponitrile in the presence of ammonia as solvent and for example, as suspension catalyst, rhodium on magnesia (U.S. Pat. No. 4,601,859), Raney Nickel (U.S. Pat. No. 2,762,835, WO 92/21650), nickel on alumina (U.S. Pat. No. 2,208,598) or, as a fixed bed catalyst, Cu—Co—Zn spinel (DE-B-954416, U.S. Pat. No. 2,257,814) or iron (DE-A-42 35 466) or a process as described in U.S. Pat. Nos. 2,245,129, 2,301,964, EP-A-150295, FR-A-2 029 540 or a process described in U.S. Pat. No. 5,496,941.

The adiponitrile required for this reaction is industrially produced for example by twofold hydrocyanation of butadiene in the presence of nickel catalysts and is commercially available for example from Aldrich-Chemie Gesellschaft mbH & Co. KG, Steinheim, Germany.

The reaction of mixture (I) to form mixture (II) can be effected as described in U.S. Pat. No. 4,628,085 in the gas phase over silica gel at 300° C.

Similarly, this reaction can be carried out as described in U.S. Pat. No. 4,625,023 in the gas phase over a silica gel or copper/chromium/barium titania catalyst.

According to FR-A-2029540, the reaction can be carried out in the presence of catalysts, the catalysts used being metallic Zn or Cu powders or oxides, hydroxides, halides, cyanides of rubidium, of lead, of mercury or of the elements having an atomic number of from 21 to 30 or from 39 to 48. The catalysts described are used as suspension catalysts in batch operated stirred autoclaves.

The reaction of mixture (I) to form mixture (II) can also be effected for example as described in EP-A-659 741, WO 96/22974, DE 19632006, WO 99/47500 or WO 99/28296.

Preferably the reaction can be carried out in the gas phase at temperatures of generally from 200 to 550° C., preferably from 250 to 400° C.; the pressure is generally in the range from 0.01 to 10 bar, preferably equal to atmospheric pressure, in which case care must be taken that the reaction mixture be predominantly gaseous under the conditions employed.

The catalyst velocities customarily range from 0.05 to 2, preferably from 0.1 to 1.5, especially from 0.2 to 1, kg of 6-aminocapronitrile per liter of catalyst volume per hour.

The reaction can be carried out batchwise, preferably continuously.

Useful reactors advantageously include reactors as generally known for gas phase reactions over moving or stationary solid catalysts. Preferably a fluidized bed reactor, preferably a fixed bed reactor, such as a tray reactor, especially a tubular reactor, can be used. Combinations of such reactors are also possible.

Generally from 1 to 50, preferably from 1 to 10, mol of water are used per mole of ACN.

The mixture (I) can also contain further organic compounds which are gaseous under the reaction conditions, such as alcohols, amines or aromatic or aliphatic hydrocarbons.

Useful catalytically active compounds for the catalysts include for example silica in the form of pyrogenic silica, in the form of silica gel, kieselguhr, quartz or mixtures thereof, copper chromite, preferably alumina, titania, preferably titanium dioxide, lanthanum phosphates, lanthanum oxides, as well as mixtures of such compounds.

Alumina is suitable in all forms which are obtainable by heating the precursor compounds aluminum hydroxide (gibbsite, boehmite, pseudoboehmite, bayerite and diaspore) at different temperatures. These include in particular gamma and alpha alumina and mixtures thereof.

Titanium dioxide is amorphous and is suitable in all its forms, preferably antase and rutile, and also mixtures thereof.

Lanthanum phosphates are useful in their various forms, stoichiometric ratios between lanthanum and phosphate unit and degrees of condensation of the phosphate units (monophosphate, oligophosphates such as diphosphates or triphosphates, polyphosphates) individually or mixed.

These compounds can be used in the form of powders, meal, spall, extrudates or pressed tablets. The form of the compounds generally depends on the requirements of the particular process used in that it is advantageous to use powder or meal in the case of the fluidized bed process and customary to use tablets or extrudates from 1 mm to 6 mm in diameter in the fixed bed process.

The compounds can be used in pure form (purity of the particular compounds >80% by weight), as a mixture of the above-mentioned compounds, in which case the sum total of the above-mentioned compounds should be >80% by weight, or as a supported catalyst, in which case the above-mentioned compounds can be applied to a mechanically and chemically stable support usually having a large surface area.

The pure compounds can be prepared by precipitation of aqueous solutions, for example titanium dioxide by the sulfate process or by other processes such as the pyrogenic production of fine alumina, titanium dioxide or zirconium dioxide powders, which are commercially available.

Several methods are available for preparing mixtures of various compounds. The compounds or their precursor compounds which are convertible into the oxides by calcination can be prepared for example by conjoint precipitation from solution. This generally provides a very good distribution of the two compounds used. The compound or precursor mixtures can also be precipitated by precipitation of a compound or precursor in the presence of a suspension of finely divided particles of the second compound or precursor. Another method is to mechanically mix the compound or precursor powders, this mixture being useful as a starting material for producing extrudates or tablets.

Supported catalysts may in principle be prepared by all methods described in the literature. Sols of compounds may be applied to the support by simply impregnating the support. Drying and calcination are customarily used to remove the volatile constituents of the sol from the catalyst. Such sols are commercially available for titanium dioxide and alumina.

A further way to apply layers of the catalytically active compounds consists in hydrolyzing or pyrolyzing organic or inorganic compounds. A ceramic support can thus be coated with titanium dioxide in a thin layer by hydrolysis of titanium isopropoxide or other titanium alkoxides. Further useful compounds include $TiCl_4$ and aluminum nitrate. Useful supports are powders, extrudates or tablets of the compounds mentioned themselves or other stable compounds such as steatite or silicon carbide. The supports used can be made macroporous to improve mass transfer.

The reaction can be carried out in the presence of a gas which is inert with regard to the conversion of mixture (I) into mixture (II), preferably argon, especially nitrogen. The volume ratio of inert gas to the ACN which is gaseous under the reaction conditions can advantageously be up to 100. Step a) is particularly preferably carried out as a process described in U.S. Pat. No. 5,646,277 or U.S. Pat. No. 5,739,324.

In these processes, the reaction is carried out in the liquid phase at temperatures of generally from 140 to 320° C., preferably from 160 to 280° C.; the pressure is generally in the range from 1 to 250 bar, preferably from 5 to 150 bar, and care is taken that the reaction mixture is predominantly liquid under the reaction conditions employed. The residence times are generally in the range from 1 to 120, preferably from 1 to 90, especially from 1 to 60, min. In some cases, residence times from 1 to 10 min have proved to be completely sufficient.

The reaction can be carried out batchwise, preferably continuously. Useful reactors include a stirred tank, autoclave, preferably a fixed bed tubular reactor. Combinations of such reactors are also possible.

Generally at least 0.1 mol, preferably 0.5 to 100, especially from 1 to 20 mol of water are used per mole of ACN.

The ACN is advantageously used in the form of a from 1 to 50% by weight, especially from 5 to 50% by weight, particularly preferably from 5 to 30% by weight, solution in water, in which case the solvent is then also the reaction partner, or in mixtures containing water and a liquid diluent. Useful liquid diluents include for example alkanols such as methanol, ethanol, n- and i-propanol, n-, i- and t-butanol and polyols such as diethylene glycol and tetraethylene glycol, hydrocarbons such as petroleum ether, benzene, toluene, xylene, lactams such as pyrrolidone or caprolactam or alkyl substituted lactams such as N-methylpyrrolidone, N-methylcaprolactam or N-ethylcaprolactam and also carboxylic esters, preferably carboxylic acids having from 1 to 8 carbon atoms. Ammonia can also be present in the reaction. It will be appreciated that mixtures of organic liquid diluents can also be used. Mixtures of water and alkanols in a water/alkanol weight ratio of 1–75/25–99, preferably 1–50/50–99, have been determined to be particularly advantageous in some cases.

It is in principle similarly possible to use ACN as a reactant and also as a solvent.

Useful heterogeneous catalysts include for example acidic, basic or amphoteric oxides of the elements of the second, third or fourth main group of the Periodic Table, such as calcium oxide, magnesium oxide, boron oxide, aluminum oxide, tin oxide or silicon dioxide as pyrogenic silica, as silica gel, kieselguhr, quartz and mixtures thereof, also oxides of metals of the second to sixth transition group of the Periodic Table, such as titanium oxide, amorphous, as anatase or rutile, zirconium oxide, zinc oxide, manganese oxide or mixtures thereof. Also useful are oxides of the lanthanides and actinides, such as cerium oxide, thorium oxide, praseodymium oxide, samarium oxide, rare earth mixed oxide, or mixtures thereof with aforementioned oxides. Further catalysts can be for example:

vanadium oxide, niobium oxide, iron oxide, chromium oxide, molybdenum oxide, tungsten oxide or mixtures thereof. Mixtures between the oxides mentioned are likewise possible. Also useful are some sulfides, selenides and tellurides such as zinc telluride, tin selenide, molybdenum sulfide, tungsten sulfide, sulfides of nickel, of zinc and of chromium.

The aforementioned compounds can be doped with or contain the compounds of the 1st and 7th main group of the Periodic Table.

Useful catalysts further include zeolites, phosphates and heteropolyacids and also acidic and alkaline ion exchangers such as for example Nafion.

These catalysts may optionally contain up to 50% by weight each of copper, tin, zinc, manganese, iron, cobalt, nickel, ruthenium, palladium, platinum, silver or rhodium.

Particularly preferred catalysts, which have very high conversions, yields, selectivities and lifetimes under the above-described reaction conditions, include heterogeneous catalysts based on titania, zirconia, ceria and alumina. These can be used in the form of powders, meal, spall, extrudates or pressed tablets. The form of the oxides generally depends on the requirements of the particular process used in that it is advantageous to use powder or meal in suspension and customary to use tablets or extrudates from 1 mm to 10 mm in diameter in the fixed bed process.

Alumina is suitable in all forms which are obtainable by heating the precursor compounds aluminum hydroxide (gibbsite, boehmite, pseudoboehmite, bayerite and diaspore) at different temperatures. These include in particular gamma and alpha alumina and mixtures thereof.

The oxides can be used in pure form (purity of the particular oxide >80% by weight), as a mixture of the above-mentioned oxides, in which case the sum total of the abovementioned oxides should be >80% by weight, or as a supported catalyst, in which case the abovementioned oxides can be applied to a mechanically and chemically stable support usually having a large surface area.

The pure oxides can be prepared by precipitation of aqueous solutions, for example titanium dioxide by the sulfate process or by other processes such as the pyrogenic production of fine alumina, titanium dioxide or zirconium dioxide powders, which are commercially available.

Several methods are available for preparing mixtures of various oxides. The oxides or their precursor compounds which are convertible into the oxides by calcination can be prepared for example by conjoint precipitation from solution. This generally provides a very good distribution of the two oxides used. The oxide or precursor mixtures can also be precipitated by precipitation of an oxide or precursor in the presence of a suspension of finely divided particles of the second oxide or precursor. Another method is to mechanically mix the oxide or precursor powders, this mixture being useful as a starting material for producing extrudates or tablets.

Supported catalysts may in principle be prepared by all methods described in the literature. Sols of oxides may be applied to the support by simply impregnating the support. Drying and calcination are customarily used to remove the volatile constituents of the sol from the catalyst. Such sols are commercially available for titanium dioxide, alumina and zirconium dioxide.

A further way to apply layers of the active oxides consists in hydrolyzing or pyrolyzing organic or inorganic compounds. A ceramic support can thus be coated with titanium dioxide in a thin layer by hydrolysis of titanium isopropoxide or other titanium alkoxides. Further useful compounds include $TiCl_4$, zirconyl chloride, aluminum nitrate and cerium nitrate. Useful supports are powders, extrudates or tablets of the oxides mentioned themselves or other stable oxides such as silicon dioxide. The supports used can be made macroporous to improve mass transfer.

In step b), ammonia is removed from mixture (II) to obtain a mixture (III) containing caprolactam, water, any liquid diluent, high boilers and low boilers.

The removal of ammonia from mixture (II) can in principle be effected by known separation processes, such as extraction or preferably distillation, or a combination thereof.

The distillation can advantageously be carried out at bottom temperatures of from 60 to 220° C., especially of from 100 to 220° C. The pressure, measured at the top of the distillation apparatus, is customarily adjusted to the range from 2 to 30 bar absolute.

The distillation apparatus may be any customary distillation apparatus as described for example in Kirk-Othmer, Encyclopedia of Chemical Technology, 3rd Ed., Vol. 7, John Wiley & Sons, New York, 1979, pages 870–881, such as sieve plate columns, bubble cap plate columns, orderedly packed columns or randomly packed columns. The distillation can be carried out in plural, such as 2 or 3, columns, advantageously a single column.

In step c), all or some of the water and any liquid diluent are removed from mixture (III) to obtain a mixture (IV) containing caprolactam, high boilers and low boilers.

When a liquid diluent was used in step a), water and liquid diluent can be removed in step c) simultaneously or the water can be removed before or after the liquid diluent.

The removal of the water and of any liquid diluent from mixture (III) can in principle be effected using known separation processes, such as extraction, crystallization or preferably distillation, or a combination thereof.

The distillation can advantageously be carried out at bottom temperatures of from 50 to 250° C., especially of from 100 to 230° C.

The distillation apparatus may be any customary distillation apparatus as described for example in Kirk-Othmer, Encyclopedia of Chemical Technology, 3rd Ed., Vol. 7, John Wiley & Sons, New York, 1979, pages 870–881, such as sieve plate columns, bubble cap plate columns, orderedly packed columns or randomly packed columns. Particular preference is given to a heat-coupled multistage removal of the water and any liquid diluent.

Before the mixture (IV) is fed into a step d) there is the possibility of removing low boilers and high boilers, advantageously only the high boilers, especially neither the low boilers nor the high boilers, particularly advantageously only the high boilers, from mixture (IV). When low boilers and high boilers are removed from the mixture, the low boilers may be removed before, after or together with the high boilers.

When low boilers and high boilers or only high boilers or only low boilers are removed, the removal may be effected in principle by known separation processes, such as extraction, crystallization or preferably distillation, or a combination thereof.

The distillation can advantageously be carried out at bottom temperatures of from 50 to 250° C., especially of from 100 to 230° C. The autogenous pressure, as measured at the top of the distillation apparatus, is customarily in the range from 1 to 500, preferably from 5 to 100, mbar absolute.

The distillation apparatus may be any customary distillation apparatus as described for example in Kirk-Othmer, Encyclopedia of Chemical Technology, 3rd Ed., Vol. 7, John Wiley & Sons, New York, 1979, pages 870–881, such as sieve plate columns, bubble cap plate columns, orderedly packed columns or randomly packed columns.

The distillation to remove the low boilers can be carried out in plural, such as 2 or 3, columns, advantageously a single column.

The distillation to remove the high boilers can be carried out in plural, such as 2 or 3, columns, advantageously a single column.

In step d), mixture (IV) is fed to a polymerization reaction.

The sum total of the contents of high boilers and low boilers without water and organic diluents in the mixture (IV) used in step d) is advantageously at least 100 weight ppm, preferably 200 weight ppm, particularly preferably at least 500 weight ppm, especially at least 1000 weight ppm based on mixture (IV).

This step serves to prepare the polymer obtainable by the process according to the invention.

Such a polymer is preferably a polyamide, the term polyamide comprehending homopolyamides, copolyamides, block polyamides, random polyamides and mixtures thereof, especially nylon 6 ("polycaprolactam") or caprolactam-units-containing nylon 66 (polyamide constructed essentially from caprolactam, adipic acid and hexamethylenediamine).

To prepare the polyamides, the caprolactam obtained in step c) can be used individually or mixed with other lactams, i.e., cyclic compounds having at least one amide group in the cycle, or aminocarboxylic acids, i.e. compounds having not only at least one amino but also at least one carboxyl group.

Preferred aminocarboxylic acids are omega-aminocarboxylic acids having from 4 to 12 carbon atoms, more preferably from 4 to 9 carbon atoms in the alkyl radical, or an aminoalkylary-carboxylic acid having from 8 to 13 carbon atoms in the alkyl radical, preferred ones of the latter having an alkylene group of at least one carbon atom between the aromatic unit and the amino and carboxyl group. Among the aminoalkylarylcarboxylic acids, preference is given in particular to those which have the amino and carboxyl group in the 1,4 position to each other.

The omega-aminocarboxylic acid is more preferably a linear omega-aminocarboxylic acid in which the alkylene radical ($—CH_2—$) preferably contains from 4 to 14, more preferably from 4 to 9, carbon atoms, such as 4-amino-1-butanecarboxylic acid, 5-amino-1-pentanecarboxylic acid, 6-amino-1-pentanecarboxylic acid (6-aminocaproic acid), 7-amino-1-hexanecarboxylic acid, 8-amino-1-heptanecarboxylic acid, 9-amino-1-octanecarboxylic acid, 10-amino-1-nonanecarboxylic acid, particularly preferably 6-aminocaproic acid.

Where such aminocarboxylic acids are capable of forming lactams through formation of a cyclic, preferably internal, amide, the use of such lactams is an advantageous option, more preference being given to the use of lactams of linear omega-aminocarboxylic acids whose alkylene moiety ($—CH_2—$) preferably contains from 4 to 14, more preferably from 4 to 9, carbon atoms, such as the lactam of 4-amino-1-butanecarboxylic acid, of 5-amino-1-pentanecarboxylic acid, of 6-amino-1-pentanecarboxylic acid (caprolactam), of 7-amino-1-hexanecarboxylic acid, of 8-amino-1-heptanecarboxylic acid, of 9-amino-1-octanecarboxylic acid, of 10-amino-1-nonanecarboxylic acid, particularly preferably caprolactam.

It will be appreciated that it is also possible to use mixtures of a plurality of lactams, a plurality of aminocarboxylic acids or mixtures of one or more lactams with one or more aminocarboxylic acids with the caprolactam of step c).

If desired, it is also possible to use lactams or aminocarboxylic acids derived from branched alkylene- or arylene- or alkylarylenes.

The caprolactam obtained from step c) may also be used together with a diamine or mixed with a plurality of diamines, i.e., compounds having at least two amino groups, such as aromatic amines, for example 1,4-phenylenediamine or 4,4'-diaminodiphenyl-propane, or aliphatic amines. Preferred aliphatic amines are the alpha,omega-diamines, especially alpha,omega-alkylenediamines having from 3 to 14 carbon atoms, more preferably from 3 to 10 carbon atoms, in the alkylene moiety, or alkylaryldiamines having from 9 to 14 carbon atoms in the alkyl moiety, preferred alkylaryldiamines being alkylaryldiamines which have an alkylene group of at least one carbon atom between the aromatic unit and the two amino groups, such as p-xylylenediamine or preferably m-xylylenediamine.

The alpha,omega-diamines used are more preferably linear alpha,omega-diamines in which the alkylene moiety ($—CH_2—$) preferably contains from 3 to 14, more preferably from 3 to 10, carbon atoms, such as 1,3-diaminopropane, 1,4-diaminobutane, 1,5-diaminopentane, 1,6-diaminohexane (hexamethylenediamine, HMD), 1,7-diaminoheptane, 1,8-diaminooctane, 1,9-diaminononane, 1,10-diaminodecane, particularly preferably hexamethylenediamine.

Hexamethylenediamine is obtainable in a conventional manner by double catalytic hydrogenation of the nitrile groups of adiponitrile.

It will be appreciated that it is also possible to use mixtures of a plurality of diamines.

If desired, it is also possible to use diamines derived from branched alkylene- or arylene- or alkylarylenes, such as 2-methyl-1,5-diaminopentane.

The caprolactam obtained from step c) may also be used together with a dicarboxylic acid or in a mixture with a plurality of dicarboxylic acids, i.e., compounds having at least two carboxyl groups. Preferred dicarboxylic acids are the alpha,omega-dicarboxylic acids, especially alpha, omega-dicarboxylic acids having from 3 to 14 carbon atoms, more preferably from 3 to 12, carbon atoms, in the alkylene moiety, or an aromatic $C_8$–$C_{12}$ dicarboxylic acid such as isophthalic acid, especially terephthalic acid, and also a $C_5$–$C_8$ cycloalkanedicarboxylic acid such as cyclohexanedicarboxylic acid.

The alpha,omega-dicarboxylic acids used are more preferably linear alpha,omega-dicarboxylic acids in which the alkylene moiety (—$CH_2$—) preferably contains from 2 to 14, more preferably from 3 to 12, carbon atoms, such as ethane-1,2-dicarboxylic acid (succinic acid), propane-1,3-dicarboxylic acid (glutaric acid), butane-1,4-dicarboxylic acid (adipic acid), pentane-1,5-dicarboxylic acid (pimelic acid), hexane-1,6-dicarboxylic acid (suberic acid), heptane-1,7-dicarboxylic acid (azelaic acid), octane-1,8-dicarboxylic acid (sebacic acid), nonane-1,9-dicarboxylic acid, decane-1,10-dicarboxylic acid, particularly preferably adipic acid.

Adipic acid is obtainable in a conventional manner by oxidation of cyclohexane.

It will be appreciated that it is also possible to use mixtures of a plurality of dicarboxylic acids.

If desired, it is also possible to use dicarboxylic acids derived from branched alkylene- or arylene- or alkylarylenes.

The caprolactam obtained in step c) may also be used together with a diamine and a dicarboxylic acid or in a mixture with one or more diamines and one or more dicarboxylic acids.

The polymer may be prepared in the presence of additives customary for the preparation of polymers, especially polyamides, such as chain regulators, heat or light stabilizers or pigments for delustering or coloration.

When the polymer is a polyamide, usual chain regulators include for example monocarboxylic acids, such as propionic acid, benzoic acid, monoamines, such as 2,2,6,6-tetramethyl-4-aminopiperidine, benzylamine, diamines, such as hexamethylenediamine, m-xylylenediamine, dicarboxylic acids, such as terephthalic acid, naphthalenedicarboxylic acid, adipic acid, trifunctional amines, tricarboxylic acids, useful heat or light stabilizers include 2,2,6,6-tetramethyl-4-aminopiperidine, variously substituted resorcinols, alkali metal halides, optionally in conjunction with copper (I) halides, useful pigments for delustering include for example titanium dioxide, zinc oxide, lead white and useful pigments for coloration include color pigments such as chromium oxide green and phthalocyanines.

The process parameters for preparing the polymers of the invention correspond in general to the process parameters for preparing polymers using pure caprolactam obtained by a prior art process. Any small processing differences are simple to determine in a few simple preliminary experiments.

The polymers obtainable by the process according to the invention can be processed to produce fibers, sheetlike structures and moldings. The process parameters for producing fibers, sheetlike structures and moldings from the polymers of the invention correspond in general to the process parameters for producing fibers, sheetlike structures and moldings from polymers obtained using pure caprolactam prepared by a prior art process. Any small processing differences are simple to determine in a few simple preliminary experiments.

We claim:

1. A process for the preparation of a polymer, wherein a) a mixture (I) containing 6-aminocapronitrile and water is caused to react in the presence of a catalyst to form a mixture (II) containing caprolactam, ammonia, water, high boilers and low boilers, after which b) ammonia is removed from mixture (II) to give a mixture (III) containing caprolactam, water, high boilers and low boilers, after which c) water is completely or partially removed from mixture (III) to give a mixture (IV) containing caprolactam, high boilers and low boilers, after which d) mixture (IV) is subjected to a polymerization reaction.

2. A process as defined in claim 1, wherein mixture (I) additionally contains an organic liquid diluent.

3. A process as defined in claim 2, wherein the liquid diluents in step c) are removed before, during or after separation of water from mixture (III).

4. A process as defined in claim 1, wherein the low boilers are separated between steps c) and d).

5. A process as defined in claim 1, wherein the high boilers are separated between steps c) and d).

6. A process as defined in claim 1, wherein the low boilers and high boilers are separated between steps c) and d).

7. A process as defined in claim 1, wherein the sum of the contents of high boilers and low boilers in mixture (IV) used in step d), calculated without water and any diluent still present, is at least 100 ppm by weight.

8. A polymer whenever obtained by a process as defined in claim 1.

9. A method of using a polymer as defined in claim 8 for the preparation of fibers, flat structures and shaped articles.

10. A fiber, flat structure or shaped article whenever produced from a polymer as defined in claim 8.

* * * * *